US012124896B2

(12) United States Patent
Ramesh et al.

(10) Patent No.: US 12,124,896 B2
(45) Date of Patent: Oct. 22, 2024

(54) SYSTEM AND METHOD FOR DIAGNOSING INOPERATIVE INKJET PATTERNS WITHIN PRINTHEADS IN AN INKJET PRINTER

(71) Applicant: Xerox Corporation, Norwalk, CT (US)

(72) Inventors: Palghat S. Ramesh, Pittsford, NY (US); Qingyu Yang, West Lafayette, IN (US); Christine A. Steurrys, Williamson, NY (US)

(73) Assignee: Xerox Corporation, Norwalk, CT (US)

( * ) Notice: Subject to any disclaimer, the term of this patent is extended or adjusted under 35 U.S.C. 154(b) by 161 days.

(21) Appl. No.: 17/856,007

(22) Filed: Jul. 1, 2022

(65) Prior Publication Data

US 2024/0005118 A1  Jan. 4, 2024

(51) Int. Cl.
*G06K 15/02* (2006.01)
*G06K 15/10* (2006.01)

(52) U.S. Cl.
CPC ......... *G06K 15/027* (2013.01); *G06K 15/102* (2013.01)

(58) Field of Classification Search
CPC .......................... G06K 15/027; G06K 15/102
See application file for complete search history.

(56) References Cited

U.S. PATENT DOCUMENTS

| 2007/0279650 | A1* | 12/2007 | Zitnick | G06T 11/60 |
| | | | | 358/1.9 |
| 2009/0059270 | A1* | 3/2009 | Opalach | G06V 20/64 |
| | | | | 358/1.15 |
| 2011/0242186 | A1* | 10/2011 | Mizes | B41J 2/2142 |
| | | | | 347/19 |
| 2013/0127946 | A1* | 5/2013 | Kanai | B41J 29/393 |
| | | | | 347/19 |
| 2015/0224801 | A1* | 8/2015 | Nakamura | B41J 11/008 |
| | | | | 347/19 |
| 2021/0283923 | A1* | 9/2021 | Moribe | H04N 1/605 |

FOREIGN PATENT DOCUMENTS

WO  WO-2020091810 A1 *  5/2020  ........... G06K 15/027

* cited by examiner

*Primary Examiner* — Quang N Vo
(74) *Attorney, Agent, or Firm* — Maginot Moore & Beck LLP

(57) ABSTRACT

A method of inkjet printer operation identifies a problem with an inkjet printer using a comparison of an index for a printhead map identifying inoperative inkjets in a printhead with indexes for clusters of extracted feature descriptors corresponding to printhead maps for printheads having inoperative inkjets stored in a dictionary in a database operatively connected to a controller in the inkjet printer. The dictionary is developed using unsupervised cluster analysis of datasets comprised of printhead maps identifying inoperative inkjets in a plurality of printheads.

26 Claims, 16 Drawing Sheets

Example of noisy row and columns removed

Raw map  Denoised print head map

Example of Median filter clean

Raw map  Denoised print head map

SYSTEM AND METHOD FOR DIAGNOSING INOPERATIVE INKJET PATTERNS WITHIN PRINTHEADS IN AN INKJET PRINTER

TECHNICAL FIELD

This disclosure is directed to printheads that eject liquid ink to form ink images on substrates as they pass the printheads and, more particularly, to methods for diagnosing printer problems arising from the occurrence of inoperative inkjets in such printheads.

BACKGROUND

Inkjet printers eject liquid ink drops from printheads to form ink images on an image receiving surface passing through the printers. The printheads include a plurality of inkjets that are arranged in some type of array. Each inkjet has a thermal or piezoelectric actuator that is coupled to a printhead driver. The printhead driver generates firing signals that correspond to ink image content data for producing ink images on media passing through the printers. The actuators in the printheads are positioned with respect to ink chambers in the printheads so when the actuators respond to the firing signals they expand into an ink chamber to eject ink drops onto passing media and form an ink image that corresponds to the ink image content data used to generate the firing signals.

Inkjets, especially those in printheads that eject aqueous inks, need to regularly fire to help prevent the ink in the nozzles formed in the faceplates of the printheads from drying. If the viscosity of the ink increases too much, the probability of an inkjet failure increases substantially. During the printing of a print job, sheets are printed with test pattern images at predetermined intervals to evaluate the operational status of the inkjets. An optical sensor generates digital image data of these test pattern images and this digital data is analyzed by the printer controller to determine which inkjets, if any, that were operated to eject ink into the test pattern did in fact do so, and if an inkjet did eject an ink drop whether the ejected drop had an appropriate mass and the drop landed where it was supposed to land. Any inkjet not ejecting an ink drop it was supposed to eject or ejecting a drop not having the right mass or landing at an errant position is called an inoperative inkjet in this document. The controller stores data in a database operatively connected to the controller that identifies the inoperative inkjets in each printhead. The sheets printed with the test patterns are sometimes called run-time missing inkjet (RTMJ) sheets and these sheets are discarded from the output of the print job. Once the inoperative inkjets are identified, the printer controller operates neighboring inkjets to attenuate the appearance of the absent or errant ink drops of inoperative inkjets.

Inoperative inkjets occur for a variety of reasons. Sometimes the length of time between operations of an inkjet or the frequency of inkjet operation can be the cause of an inkjet becoming inoperative. In other situations, the position of the printhead within the print zone can make inkjets in a printhead more susceptible to failing. For example, printheads located at the end of the print zone in the process direction can experience stronger airflows than printheads positioned in the center of the print zone. Similarly, inboard printheads may experience more air turbulence than outboard printheads. Proximity to the heat sources, such as driers, can also affect the operational status of inkjets in a printhead. Printhead maintenance operations may also affect inkjet performance adversely. For example, a printhead that has been purged may have its faceplate wiped with a wiper that needs replacement or that has had ink debris dry on it. Consequently, wiping a faceplate with such a wiper may result in clogged nozzles rather than clean nozzles.

In the past, service personnel have noticed that some inoperative inkjet patterns can be correlated to particular issues in an inkjet printer. The intervention of these personnel, however, requires the printer to be taken out of service, a technician called, and human analysis conducted to identify the printer problems. Being able to correlate automatically inoperative inkjet patterns in printheads to known causes with solutions would be beneficial.

SUMMARY

A new method generates a dictionary of inoperative inkjet patterns useful for diagnosing inoperative inkjet issues in an inkjet printer. The method includes identifying at least one cluster of feature descriptors from a plurality of inoperative inkjet patterns, generating an index using one of the feature descriptors that is closest to a center of the at least one cluster, and storing the at least one cluster of feature descriptors in a non-transitory computer readable storage memory in association with the generated index.

A new inkjet printer diagnoses inoperative inkjet issues in the printer. The inkjet printer includes at least one printhead configured to eject drops of ink onto media passing by the at least one printhead, at least one optical sensor configured to generate image data of the ink drops that landed onto the media passing the at least one printhead, a non-transitory computer readable storage memory in which indexes of clusters of inoperative inkjet patterns are stored, and a controller operatively connected to the at least one printhead and the at least one optical sensor. The controller is configured to operate the at least one printhead to print a test pattern on the media passing the at least one printhead, the operation of the at least one printhead using every inkjet in the at least one printhead in the printer, receive image data of the test pattern on the media from the at least one optical sensor, generate a printhead map for the at least one printhead in the printer using the generated image data, generate an index for each generated printhead map, compare the index for each generated printhead map to the indexes of the clusters of the inoperative inkjet patterns stored in the non-transitory computer readable storage memory, identify a problem in the inkjet printer in response to a quantification of similarity between the index for each generated printhead map and at least one of the indexes of the clusters being greater than a predetermined threshold.

A new inoperative inkjet pattern analyzer generates a dictionary of inoperative inkjet patterns useful for diagnosing inoperative inkjet issues in an inkjet printer. The new analyzer includes a non-transitory computer readable storage memory, and a controller operatively connected to the non-transitory computer readable storage memory, the controller being configured to identify at least one cluster of feature descriptors from a plurality of inoperative inkjet patterns, generate an index using one of the feature descriptors that is closest to a center of the at least one cluster, and store the at least one cluster of feature descriptors in the non-transitory computer readable storage memory in association with the generated index.

A new method of operating an inkjet printer diagnoses inoperative inkjet issues in the printer. The new method includes printing a test pattern on media using every inkjet in every printhead in the printer, generating image data of the test pattern on the media, generating a printhead map for every printhead in the printer using the generated image data, generating an index for the printhead map, comparing the index for the printhead map to indexes of clusters of inoperative inkjet patterns stored in non-transitory computer readable storage memory, identifying a problem in the inkjet printer in response to a quantification of similarity between the index for the printhead map and at least one of the indexes of the clusters being greater than a predetermined threshold.

BRIEF DESCRIPTION OF THE DRAWINGS

The foregoing aspects and other features of operating an inkjet printer to correlate inoperative inkjet patterns to known causes with solutions automatically are explained in the following description, taken in connection with the accompanying drawings.

DETAILED DESCRIPTION

Figure 1:
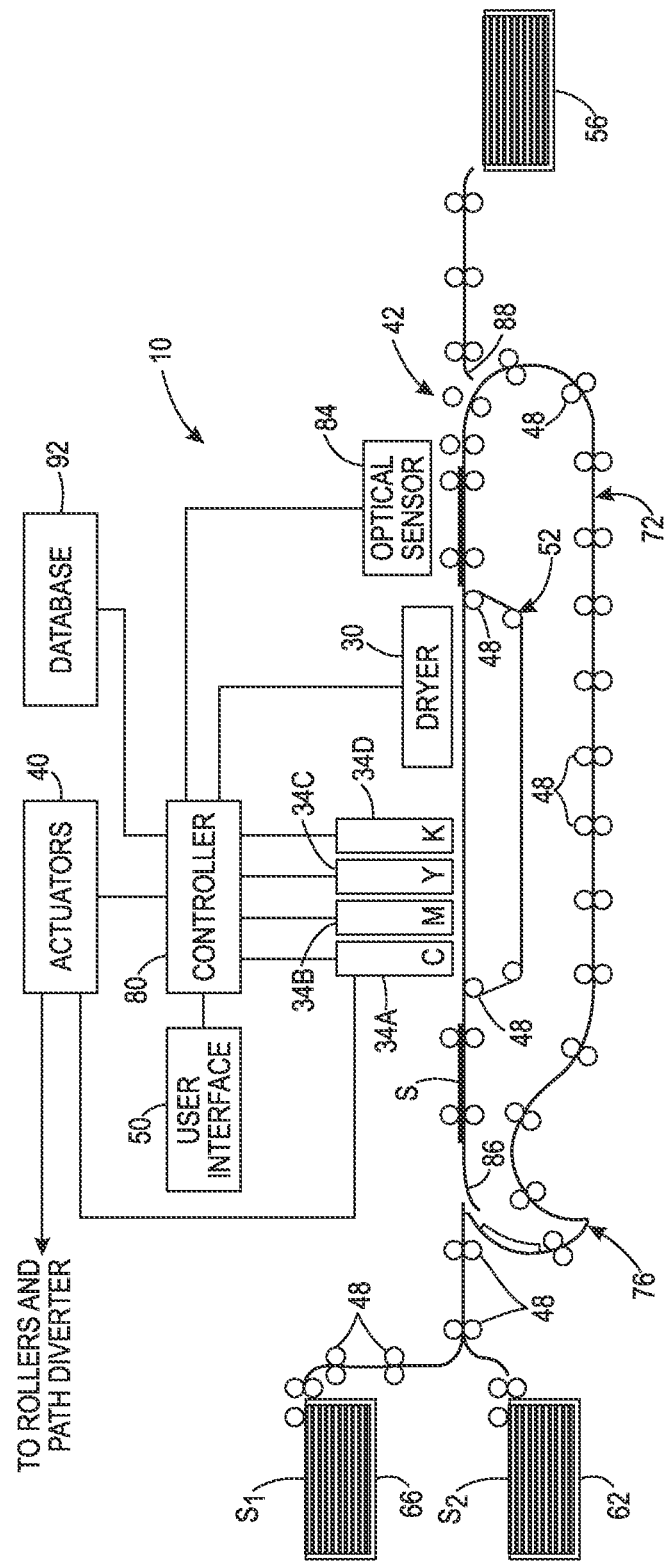
FIG. 1 depicts an inkjet printer that correlates inoperative inkjet patterns in printheads to problems and solutions automatically.

For a general understanding of the environment for the system and method disclosed herein as well as the details for the system and method, reference is made to the drawings. In the drawings, like reference numerals have been used throughout to designate like elements. As used herein, the word "inkjet printer" encompasses any apparatus that produces ink images on media by operating inkjets in printheads to eject drops of ink toward media passing by the printheads. As used herein, the term "process direction" refers to a direction of travel of the media on which the ink images are being formed and the term "cross-process direction" is a direction that is substantially perpendicular to the process direction along the surface of the media.

FIG. 1 depicts a high-speed color inkjet printer 10 that is configured to compare indexes of printhead maps produced from digital image data of test patterns on RTMJ sheets with indexes of inoperative inkjet pattern clusters stored in a dictionary within database 92 to diagnose issues impacting printed image quality in the printer. As illustrated, the printer 10 is a printer that directly forms an ink image on a surface of a media sheet stripped from one of the supplies of media sheets $S_1$ or $S_2$ and the sheets S are moved through the printer 10 by the controller 80 operating one or more of the actuators 40 that are operatively connected to rollers or to at least one driving roller of conveyor 52 that comprises a portion of the media transport 42 that passes through the print zone PZ (shown in FIG. 2) of the printer. In one embodiment, each printhead module has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads that enables media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

Figure 2:
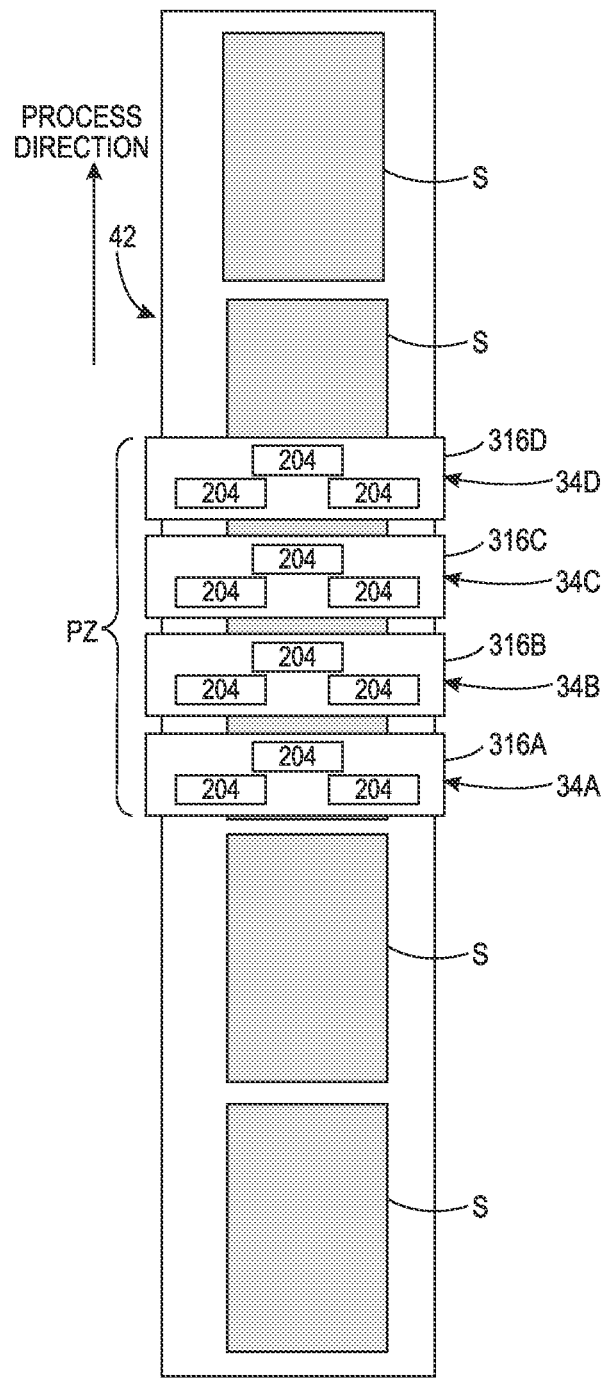
FIG. 2 is a diagram of the print zone in the printer of FIG. 1.

The print zone PZ in the printer 10 of FIG. 1 is shown in FIG. 2. The print zone PZ has a length in the process direction commensurate with the distance from the first inkjets that a sheet passes in the process direction to the last inkjets that a sheet passes in the process direction and it has a width that is the maximum distance between the most outboard inkjets on opposite sides of the print zone that are directly across from one another in the cross-process direction. Each printhead module 34A, 34B, 34C, and 34D shown in FIG. 2 has three printheads 204 mounted to one of the printhead carrier plates 316A, 316B, 316C, and 316D, respectively. The printheads of each module eject the same color of ink, which in the printer 10 means that the printheads of module 34A eject cyan ink, the printheads of module 3BA eject magenta ink, the printheads of module 34C eject yellow ink, and the printheads of module 34D eject black ink. The printheads 204 on the left side of the modules in the process direction are called the inboard printheads in this document, the printheads 204 on the right side of the modules in the process direction are called the outboard printheads in this document, and the printheads 204 between the inboard and the outboard printheads are called the center printheads.

As shown in FIG. 1, the printed image passes under an image dryer 30 after the ink image is printed on a sheet S. The image dryer 30 can include an infrared heater, a heated air blower, air returns, or combinations of these components to heat the ink image and at least partially fix an image to the web. An infrared heater applies infrared heat to the printed image on the surface of the web to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

A duplex path 72 is provided to receive a sheet from the transport system 42 after a substrate has been printed and move it by the rotation of rollers in an opposite direction to the direction of movement past the printheads. At position 76 in the duplex path 72, the substrate can be turned over so it can merge into the job stream being carried by the media transport system 42. The controller 80 is configured to flip the sheet selectively. That is, the controller 80 can operate actuators to turn the sheet over so the reverse side of the sheet can be printed or it can operate actuators so the sheet is returned to the transport path without turning over the sheet so the printed side of the sheet can be printed again. Movement of pivoting member 88 provides access to the duplex path 72. Rotation of pivoting member 88 is controlled by controller 80 selectively operating an actuator 40 operatively connected to the pivoting member 88. When pivoting member 88 is rotated counterclockwise as shown in FIG. 1, a substrate from media transport 42 is diverted to the duplex path 72. Rotating the pivoting member 88 in the clockwise direction from the diverting position closes access to the duplex path 72 so substrates on the media transport move to the receptacle 56. Another pivoting member 86 is positioned between position 76 in the duplex path 72 and the media transport 42. When controller 80 operates an actuator to rotate pivoting member 86 in the counterclockwise direction, a substrate from the duplex path 72 merges into the job stream on media transport 42. Rotating the pivoting member 86 in the clockwise direction closes the duplex path access to the media transport 42.

As further shown in FIG. 1, the printed media sheets S not diverted to the duplex path 72 are carried by the media transport to the sheet receptacle 56 in which they are be collected. Before the printed sheets reach the receptacle 56, they pass by an optical sensor 84. The optical sensor 84 generates image data of the printed sheets and this image data is analyzed by the controller 80. The controller 80 is configured to identify inoperative inkjets in the printed images of test patterns on the RTMJ sheets inserted into a print job and generate a printhead map for each printhead in the print zone. The RTMJ sheets are discarded from the output of the print job. To identify the inoperative inkjets, the test pattern images are analyzed by the controller 80 to determine which inkjets, if any, that were operated to eject ink into the test pattern did in fact do so, and if an inkjet did eject an ink drop whether the drop landed at its intended position with an appropriate mass. Any inkjet not ejecting an ink drop it was supposed to eject or ejecting a drop not having the right mass or landing at an errant position is identified as an inoperative inkjet. The controller 80 generates a printhead map using the identified inoperative inkjets and generates an index using the printhead map. The index for the printhead map is compared to the indexes of clusters stored in database 92 operatively connected to the controller. The highest similarity score between the index of the printhead and one of the indexes stored in the dictionary 212 identifies the cluster most like the generated printhead map. The known causes and solutions stored in association with the index identified from the dictionary is used to diagnose issues in the printer 10 as described in more detail below. The optical sensor can be a digital camera, an array of LEDs and photodetectors, or other devices configured to generate digital image data of a passing surface. As already noted, the media transport also includes a duplex path that can turn a sheet over and return it to the transport prior to the printhead modules so the opposite side of the sheet can be printed. While FIG. 1 shows the printed sheets as being collected in the sheet receptacle, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operatively connected to the components of the printhead modules 34A-34D (and thus the printheads), the actuators 40, and the dryer 30. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, ink image content data for an ink image to be produced is sent to the controller 80 from either a scanning system or an online or work station connection. The ink image content data is processed to generate the inkjet ejector firing signals delivered to the printheads in the modules 34A-34D. Along with the ink image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job and the term "ink image content data" means digital data that identifies a color and a volume of each pixel that forms an ink image to be printed on a media sheet.

To produce the dictionary 212 stored in the database 92, an inoperative inkjet pattern analyzer described below processes datasets of multiple printhead maps to identify meaningful inoperative inkjet clusters, generate indexes for the clusters so they can be searched and correlated to indexes for printhead maps generated from the digital image data of test patterns on RTMJ sheets, and identify the known causes for the clusters. The printhead maps in the datasets processed by the analyzer are two dimensional arrays, each one of which, in one embodiment, is 24 rows by 236 columns that correspond with the 24 by 236 arrangement of the inkjet nozzles in the faceplates of the printheads in the printer of that embodiment. The values at each location in the array correspond to the operational status of the inkjets, which in the same embodiment, are a binary one, which represents an inoperative inkjet, and a binary zero, which represents an operational inkjet. Because groups of inoperative inkjets are more likely to affect the printed image quality than isolated individual inkjets, the development of an inoperative inkjet pattern analyzer is based on identifying and clustering the different inoperative inkjet patterns having multiple inoperative inkjets in the printhead maps of a dataset.

Figure 3:
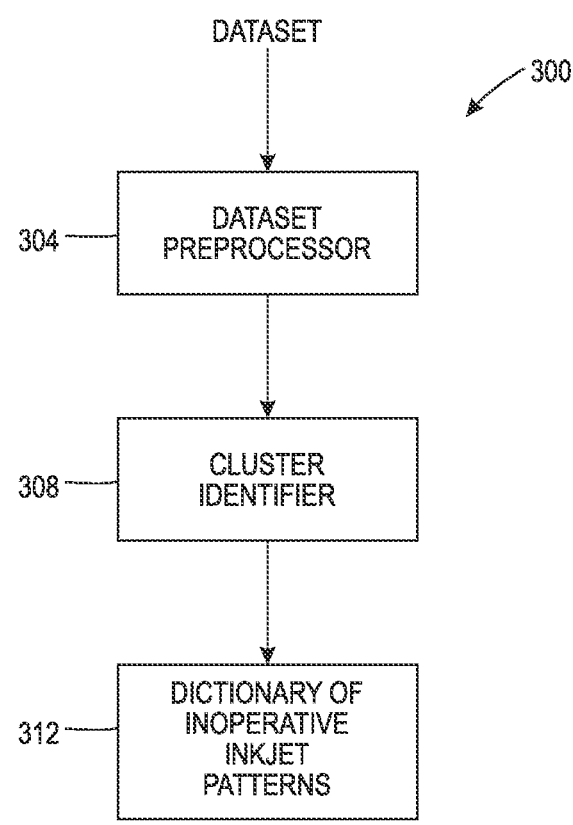
FIG. 3 is a block diagram of an inoperative inkjet pattern analyzer.

FIG. 3 shows an analyzer 300 for processing one or more datasets of printhead maps. The analyzer 300 includes a dataset preprocessor 304, a cluster identifier 308, and a dictionary of inoperative inkjet patterns 312. The dataset preprocessor 304 removes noise and nonmeaningful printhead maps from the dataset and then sends the cleaned dataset to the cluster identifier 308 for identification of inoperative inkjet pattern clusters and the generation of indexes for retrieving the inkjet pattern clusters. The identified inoperative inkjet clusters and their indices are stored in the dictionary 312. A cause for each identified cluster is also associated with the index for each identified cluster so the cause of the cluster and its remedy can be determined once an index for a single printhead map generated from digital image data of a test pattern on a RTMJ sheet is matched with one of the indexes for the clusters stored in the dictionary 312.

As noted previously, the datasets are groups of printhead maps. For the print zone shown in FIG. 2, multiple printhead maps are generated for each printhead, which means twelve datasets are generated for the printheads. Additionally, a dataset containing the printhead maps for all four of the inboard printheads is generated, a dataset containing the printhead maps for all four of the outboard printheads is generated, and a dataset containing the printhead maps for all four of the center printheads is generated. A dataset is also generated for each printhead module 34A, 34B, 34C, and 34D using the printhead maps for the printheads in each printhead module. Each of these datasets is provided to the dataset preprocessor 304 for the removal of noisy printhead maps. This noise removal is necessary because the printhead maps in the datasets were collected from logs of the images generated by the optical sensor 84 of prior test patterns printed on RTMJ sheets. Only a small portion of these printhead maps include interesting inoperative inkjet patterns. The noise removal preprocessing provides a dataset consisting of the interesting patterns.

Figure 4:
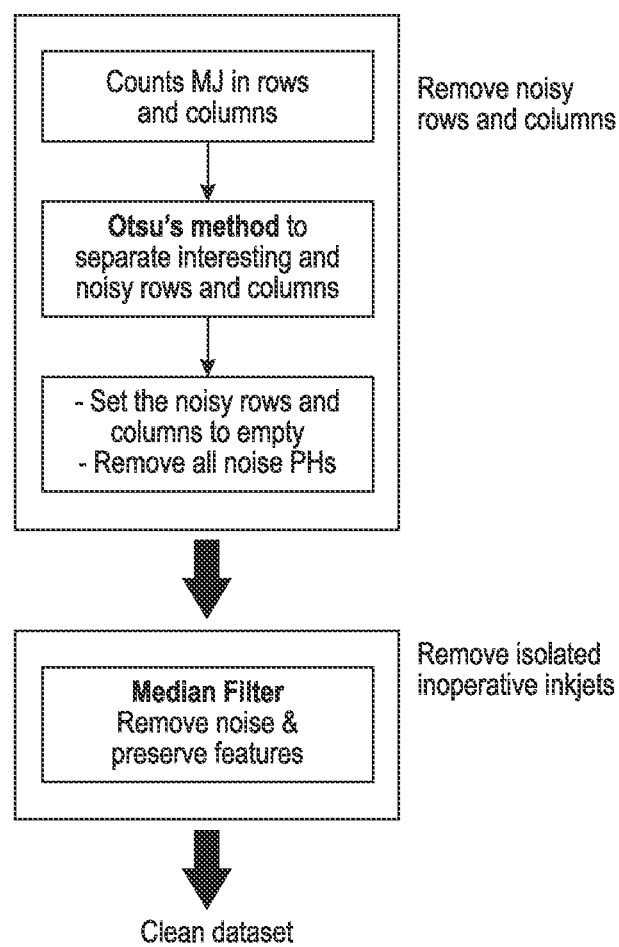
FIG. 4 is a flow diagram for removing noise from datasets received by the analyzer of FIG. 3.
Figure 5A:
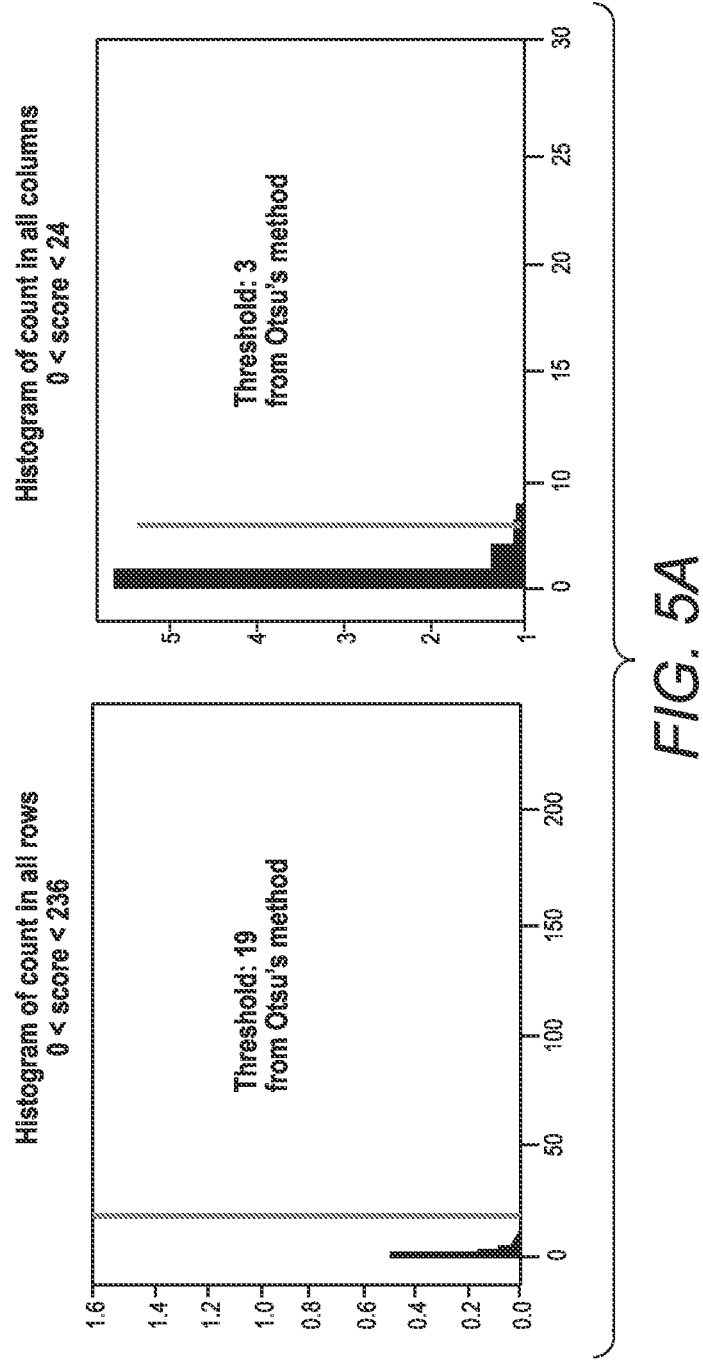
FIG. 5A is a graph of histograms for inoperative inkjet counts using two different adaptive thresholds in the process of FIG. 4.
Figure 5B:
FIG. 5B depicts two printhead maps before and after noise has been removed from the maps.
Figure 5B:
Figure 5B:
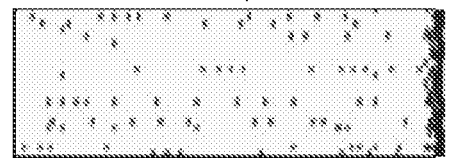
Figure 5B:
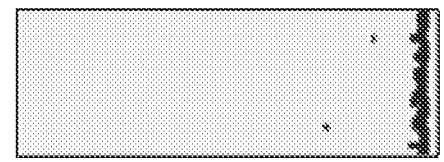

One aspect of the noise removal performed by the preprocessor 304 is the elimination of the effects of scattered (isolated) inoperative inkjets in the printhead maps. FIG. 4 shows the details of the processing performed by the preprocessor 304 for the removal of the effects of isolated inoperative inkjets. The number of inoperative jets in all the rows for all of the printhead maps in a dataset are counted. Based on the total number of inoperative inkjets, Otsu's method is used to select an adaptive threshold to separate the rows into noise rows and interesting rows. This same process is repeated to separate the interesting columns from the noise columns. FIG. 5A shows the computed thresholds with the histograms of inoperative inkjet counts in all of the rows and columns of a dataset. Besides the number of inoperative inkjets, the concentration of the inoperative inkjets in each printhead map is considered. A median filter with a window of 1 by 3, for example, is used to eliminate the isolated inoperative inkjets and preserve a dataset of the interesting patterns from the initial dataset. As used in this document, the term "median filter" means a predetermined window within a dataset that replaces each pixel within the window with the median of the pixel values within the window. The median filter is used to denoise a dataset. As used in this document, the term "isolated inkjet" means an inoperative inkjet that has no other inoperative inkjets in the rows and columns adjacent to the inoperative inkjet. Finally, if the total number of inoperative inkjets in a printhead map from which the scattered inoperative inkjets have been removed is smaller than a threshold, which in one embodiment is five, the maps are treated as noise maps and deleted from the dataset. Two examples of this processing on two printhead maps are shown in FIG. 5B. Processing of datasets with a preprocessor configured in the described manner shows has revealed that around 10% of the printhead maps in an initial dataset provides a filtered dataset having a plurality of interesting inoperative inkjet patterns.

Figure 6:
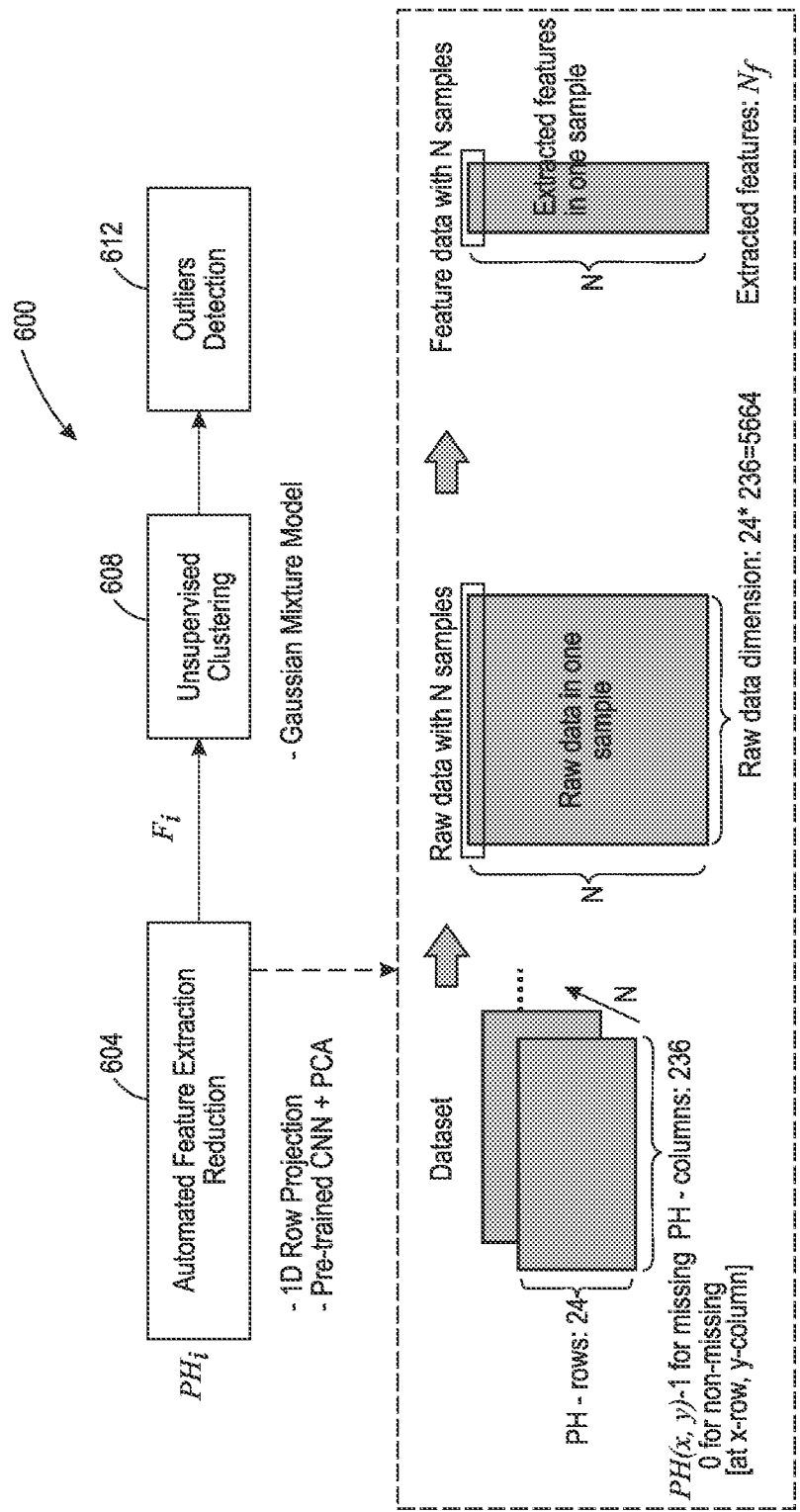
FIG. 6 is a flow diagram of a process for identifying clusters of inoperative inkjets and removing outliers from the clusters.

The block diagram in the upper portion of FIG. 6 represents the process 600 performed by the cluster identifier 308 on the printhead maps of the cleaned datasets received from the dataset preprocessor 304. In the figure, $PH_i$ is a cleaned printhead map that is depicted as a two-dimensional binary image in the dataset in the lower portion of the figure. The process 600 begins by extracting features $F_i$ from each printhead map of a cleaned dataset and the dimensions of the extracted feature vectors are reduced in block 604. An unsupervised clustering method is used to cluster the extracted features and assign a label k to each extracted feature in block 608. Each cluster (k) indicates one particular type of inoperative inkjet pattern. Features that deviate too far from a particular type of inoperative inkjet pattern, also called outliers in this document, are removed from the cluster for a particular type of pattern in block 612.

Figure 7A:
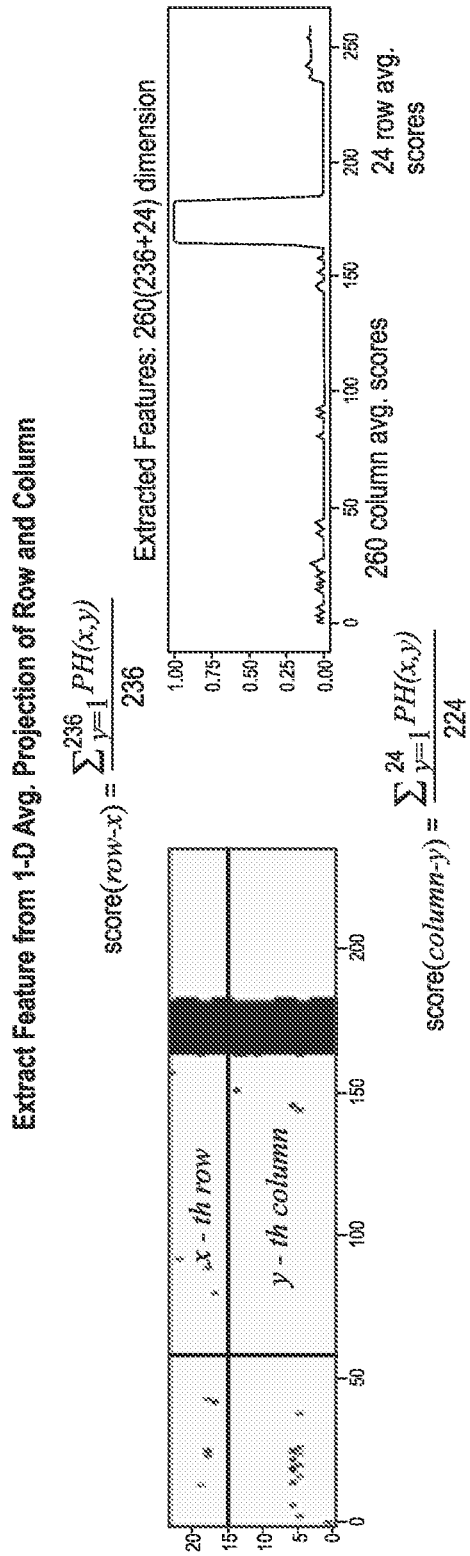
FIG. 7A and FIG. 7B illustrate two methods for generating feature descriptors corresponding to printhead maps that have had noise removed from them.
Figure 7B:
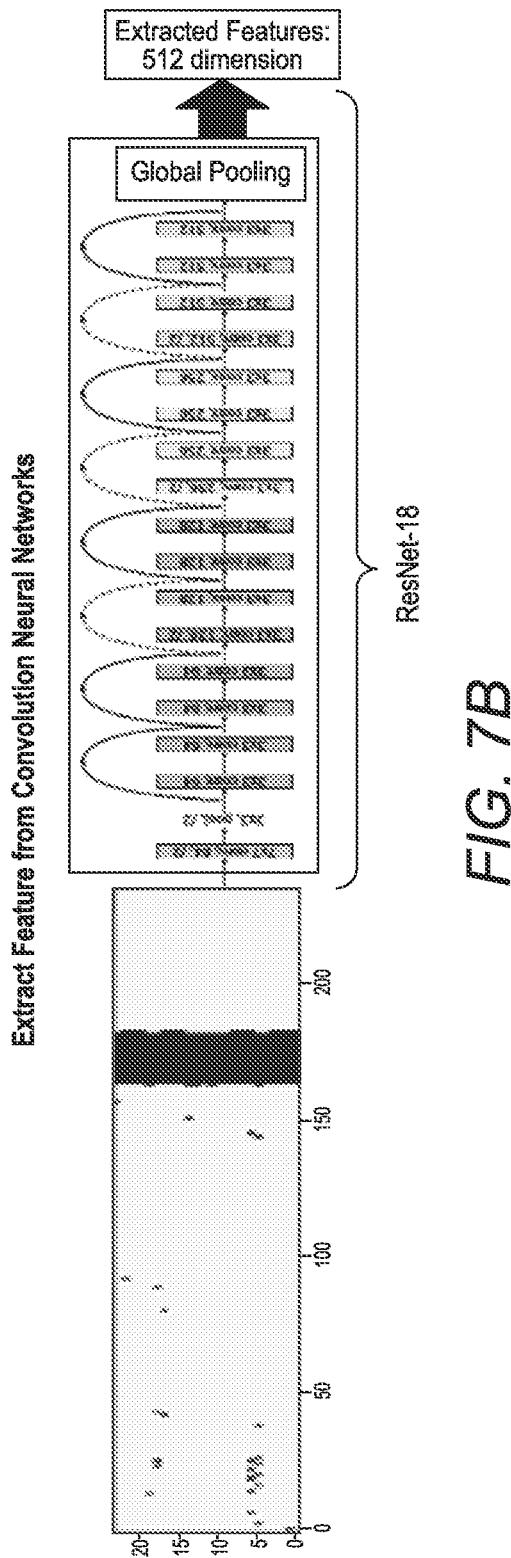

To extract features from printhead maps and reduce the dimensions of the extracted features in block 604, two methods are used. The first method performs a one-dimensional average projection of the rows and columns in a printhead map. Specifically, for each row and column in the printhead map, a score is calculated as the average number of the inoperative inkjets in the row or column. That is, the number of inoperative inkjets in the row or column divided by the number of inkjet positions in the row or column, respectively. The scores are concatenated to form a feature descriptor for the printhead map. In the example being discussed, the feature descriptor has 236 concatenated column scores to which 24 row scores are concatenated since a printhead face for each printhead in the print zone of FIG. 2 has 24 rows and 236 columns. The rightmost plot in FIG. 7A shows an example of an extracted feature descriptor formed in this manner. As used in this document, the term "feature descriptor" means a vector of numbers having a fixed length that summarizes the unique features of a data set. The second method of extracting features uses a Convolutional Neural Network (CNN) model to extract features from the printhead maps of a dataset. The CNN model is pre-trained on the ImageNet dataset, which is a known dataset useful for training neural networks. The flattened output from the top layer of the CNN model, sometimes called a global pooling layer, defines the extracted features of the printhead maps. In one embodiment, the pre-trained ResNet-18 architecture is used to extract the features with the feature descriptors having a dimension of 512 as shown in FIG. 7B. Because clustering is more efficient on the feature descriptors having smaller dimensions, the principal component analysis (PCA), also known in the neural network art, is used during the feature extraction processing to reduce the dimension of the extracted feature descriptors. After applying the PCA, the dimension of the one-dimensional average projection feature descriptors is reduced from 260 dimensions to 13 dimensions and the dimension of the CNN feature descriptors is reduced from 512 dimensions to 10 dimensions.

Figure 8A:
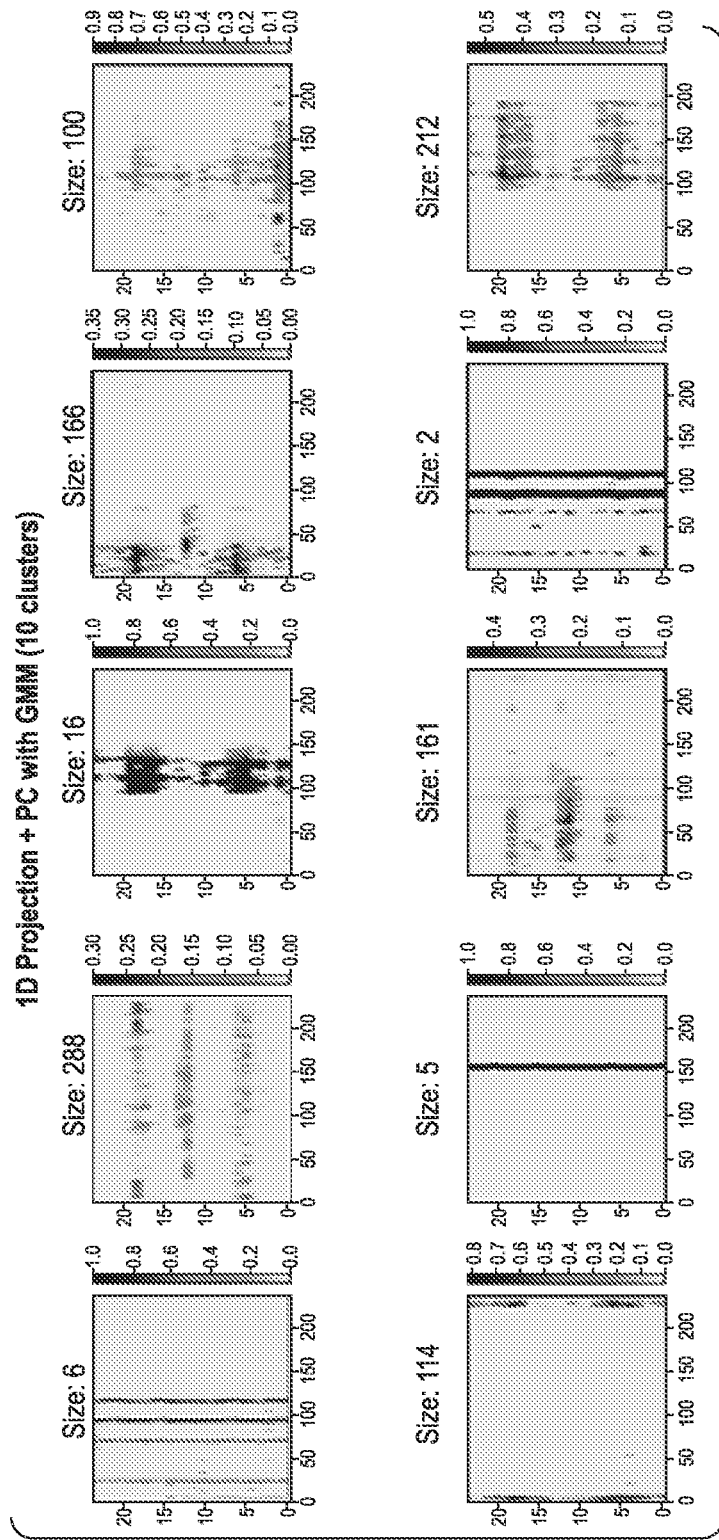
FIG. 8A depicts examples of clusters generated by the first method shown in FIG. 7A.
Figure 8B:
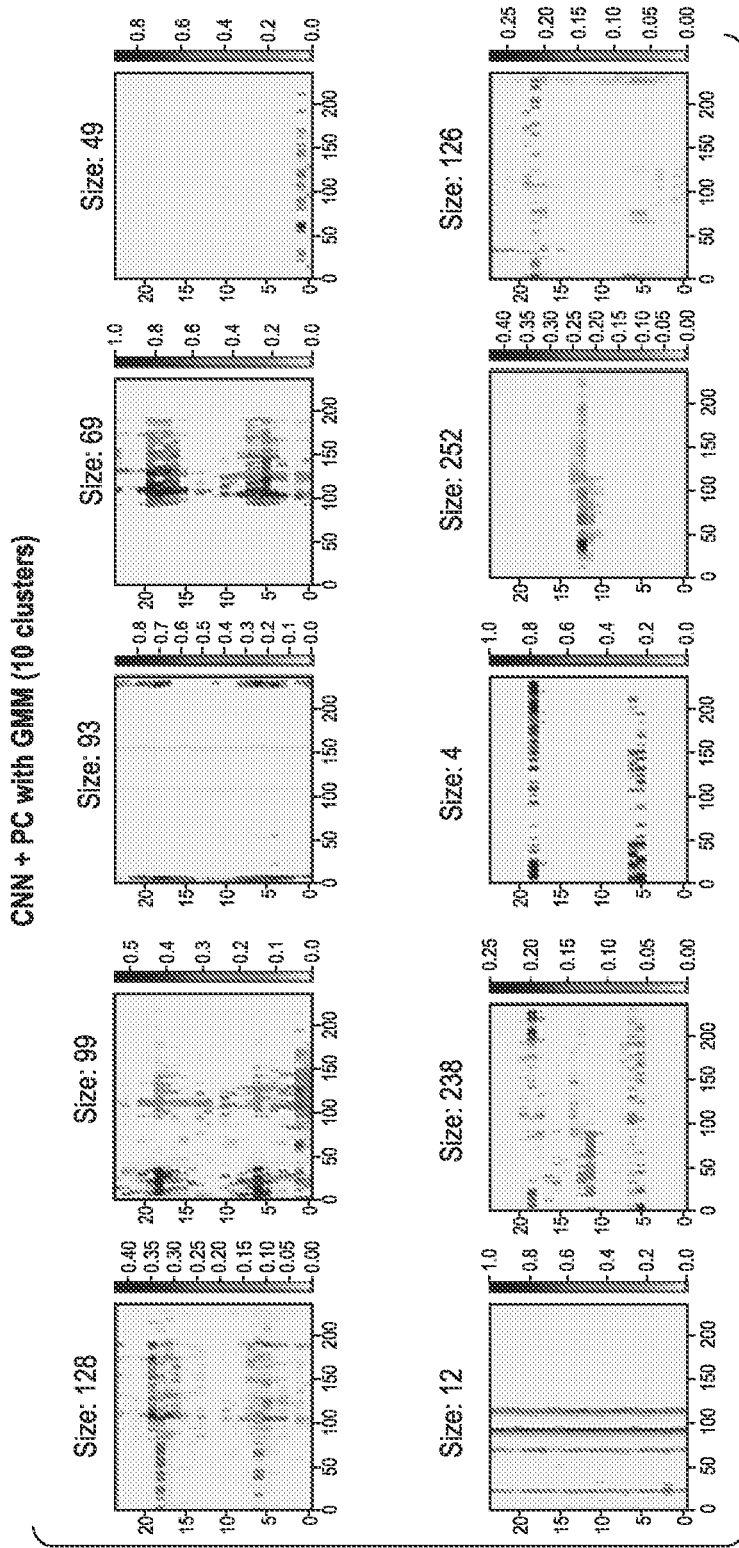
FIG. 8B depicts examples of clusters generated by the second method shown in FIG. 7B.

The cluster identifier 308 of FIG. 3 uses the Gaussian Mixture Model (GMM), which is a probabilistic model, to fit the feature descriptors to K number of Gaussian distributions, each with a set of fitted parameters. To determine the value of K, a range of K distributions is selected. The GMM model is fitted to the feature descriptor for each candidate K. The inter-class variance, intra-class variance, Silhouette coefficient, and Calinski-Harabasz Index is used to quantify the model's performance for optimizing K. After clustering, all the feature descriptors are classified into a specific cluster k, where k=1, 2, . . . , K. The cluster results for the one-dimensional feature descriptors are shown in FIG. 8A and the cluster results for the CNN feature descriptors are shown in FIG. 8B. The figures show the mean printhead map for each of the ten clusters identified using the two different methods and the size of each cluster shown in the figures is the number of the feature descriptors in the cluster. The figures demonstrate that the cluster identifier can separate the feature descriptors corresponding to printhead maps of a dataset into various inoperative inkjet patterns, such as, single vertical lines, multiple vertical lines, corner vertical lines, stronger horizontal lines, and weaker horizontal lines. The number of feature descriptors in a cluster indicates the strength of the inoperative inkjet patterns represented by the feature descriptors in the clusters. Frequently occurring inoperative inkjet patterns indicate possible recurring issues in a printer and suggest further investigation to explore the causes of the issues. These causes, once identified, and their solutions can be associated with the corresponding cluster and used in an operational printer to diagnose printer problems as discussed further below.

Figure 9A:
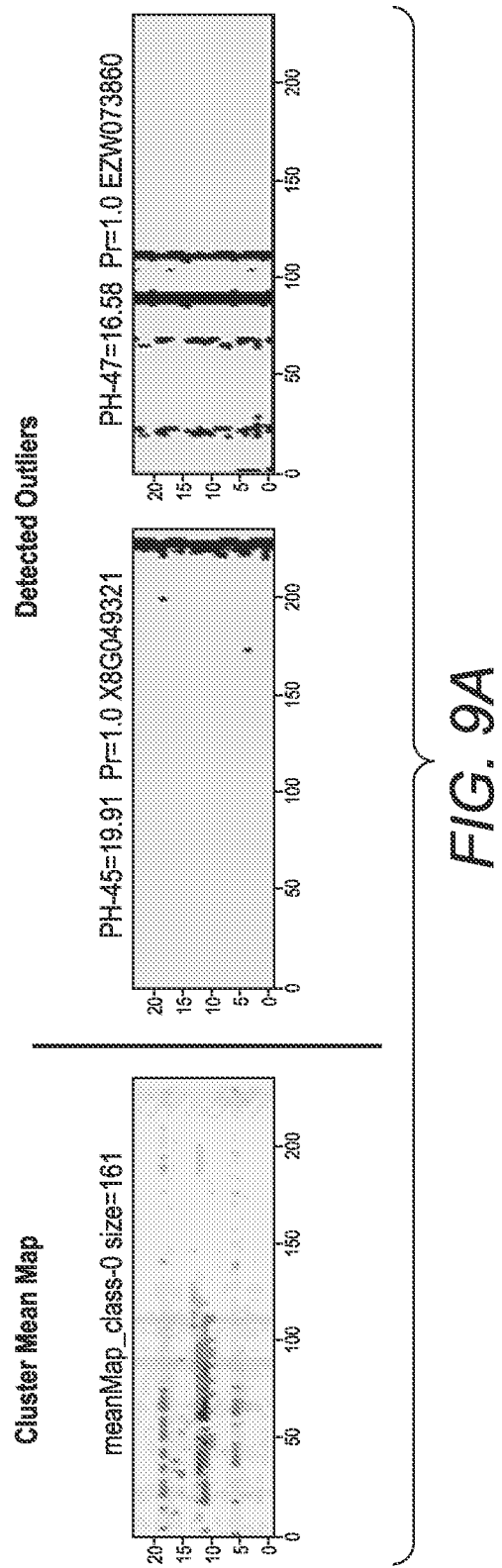
FIG. 9A, FIG. 9B, and FIG. 9C depict examples of a mean printhead map for three different clusters and the outliers removed from the clusters.
Figure 9B:
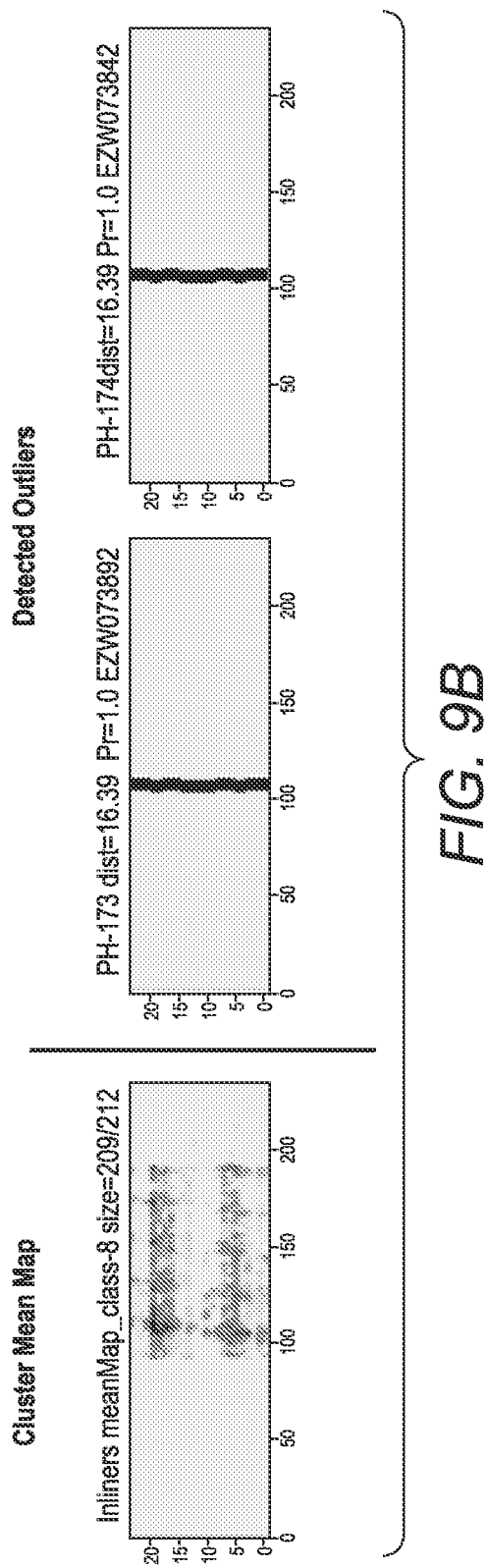
Figure 9C:
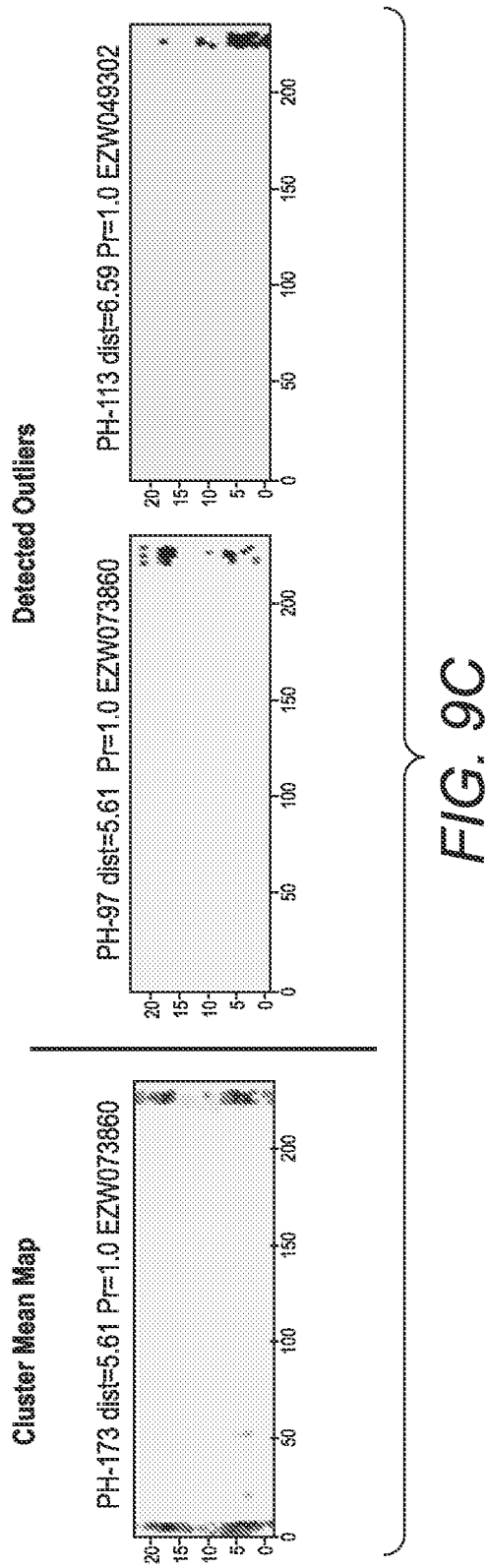

For the clusters identified using the GMM method, all of the extracted feature descriptors in each cluster are assumed to be generated from a mixture of K Gaussian distributions. However, some extracted feature descriptors in a cluster may not fit the model well and these outliers can affect the quality of the cluster. To preserve the quality of the clusters, the outliers are detected and removed by calculating a distance between the extracted feature descriptors in a cluster and the mean feature descriptor of the cluster. The distance is represented as $d_i = F_i - \Sigma F_i i \epsilon k n_k$, where the feature descriptor i is assigned to the cluster k and $n_k$ is the size of the cluster k. Within each cluster, the outliers are detected by using the z-score of the distances with a threshold of ±3. In the example being discussed, this method identifies 21 outliers and 6 outliers from 1,070 printhead maps in the clustered results generated using the one-dimensional projection features and the CNN features, respectively. FIG. 9A, FIG. 9B, and FIG. 9C show examples of the outliers detected in the clusters identified using the one-dimensional projection features and the GMM method shown in FIG. 8A. In FIG. 9A and FIG. 9B, the outlier images clearly have vertical lines, which are different than the mostly horizontal-line patterns of the clusters. In these clusters, the GMM method misclassifies the extracted feature descriptors as belonging in the cluster with a high confidence but the distance-based outlier detection removes the outliers and maintains the quality of each identified cluster.

Figure 10:
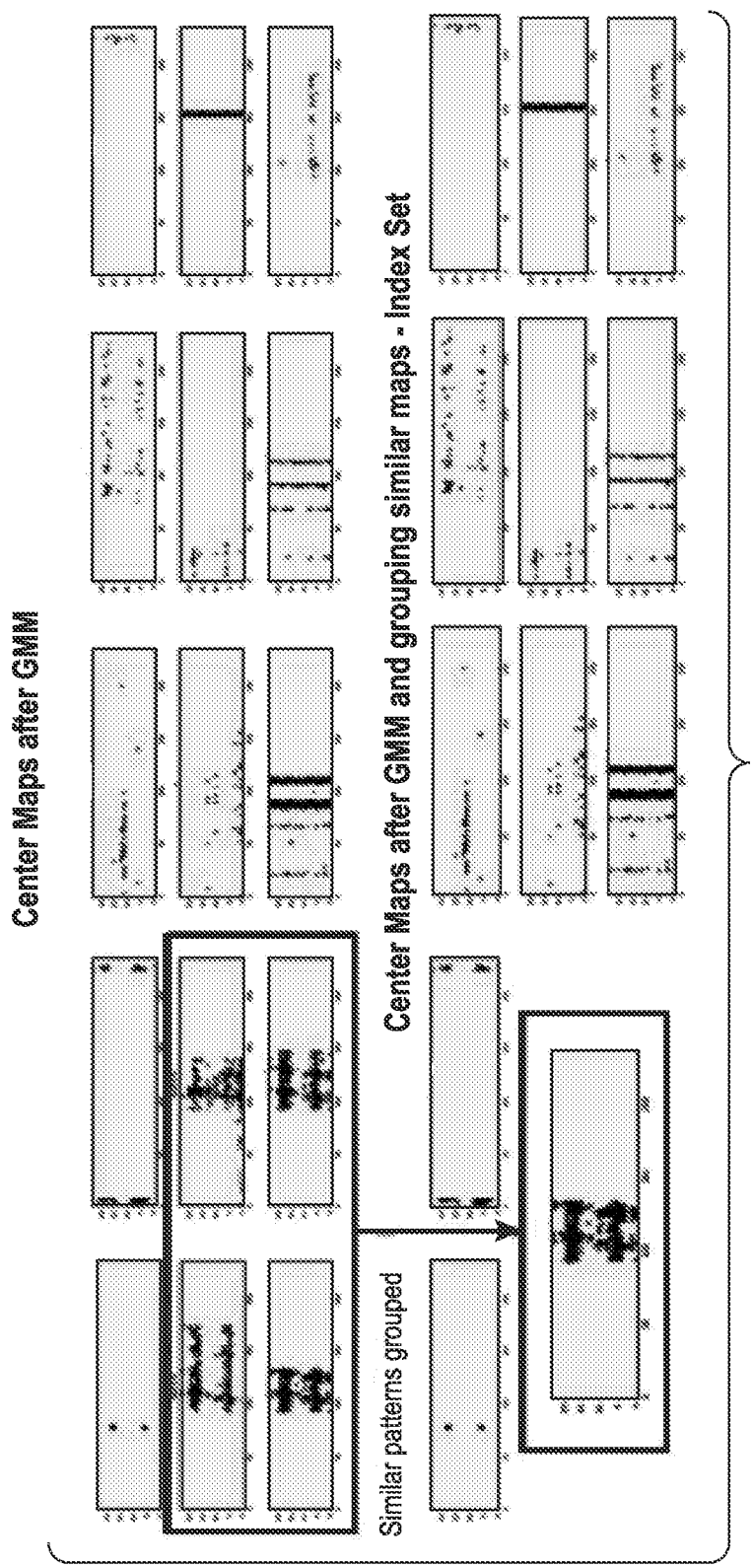
FIG. 10 illustrates the merger of clusters having high similarity scores.

The extracted feature descriptors in each cluster that are closest to the centers of the clusters are identified as an index feature descriptor for a cluster. So the index feature descriptor for each cluster is unique with respect to the other index feature descriptors for the other clusters, a matching score is calculated between each pair of index feature descriptors. A matching score is a quantification of the similarity between the patterns in two feature descriptors (labeled as $PH_1, PH_2$) by considering the normalized cross correlations of their overlapped areas as $PH_1$ slides over $PH_2$. The matching score is defined as the maximum value of the computed normalized cross correlations between the two extracted feature descriptors. If the matching score is larger than a predetermined threshold, then the corresponding clusters are merged and are to be associated with the same index feature descriptor. An index for the new cluster is generated using the extracted feature descriptor that is closest to the center of the new cluster. An example of this merging of clusters is shown in FIG. 10. In the figure, fifteen index maps for fifteen clusters are shown in the upper portion of the figure. The four index maps within the rectangle to the left having matching scores that are greater than the predetermined threshold so the corresponding clusters are merged and associated with an index generated using the extracted feature descriptor that is closest to the center of the newly formed cluster. The indexes for the other clusters are generated using the extracted feature descriptors closest to the centers of each cluster. The index for each cluster can be a hash tag of the index extracted feature descriptor or the like. The clusters are then stored in association with their indexes in a dictionary of the database of a printer, such as printer 10 shown in FIG. 1. This dictionary can be used to identify problematic inoperative inkjet patterns that occur in test patterns printed on RTMJ sheets during a print job as well as the causes for the problematic patterns.

Figure 11:
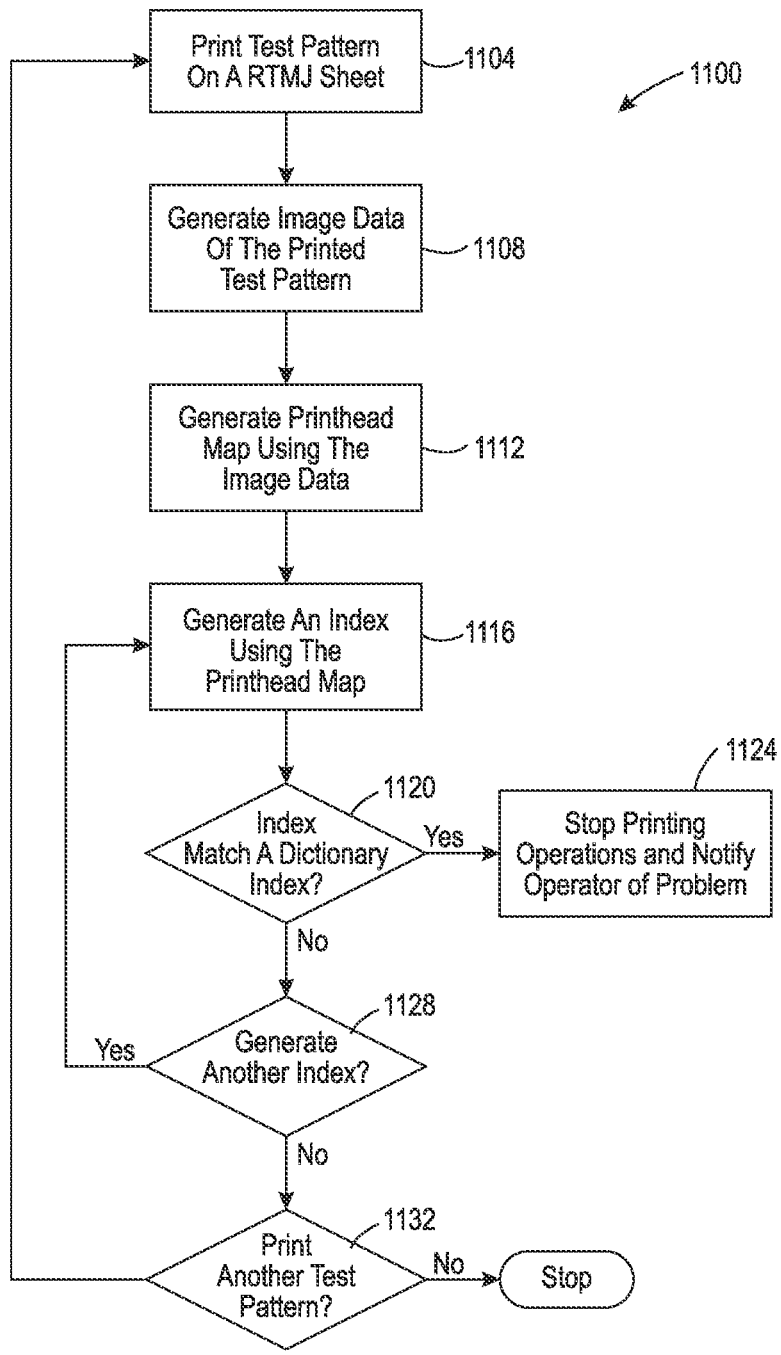
FIG. 11 is a flow diagram of a process used by the controller of the inkjet printer of FIG. 1 to correlate inoperative inkjet patterns detected during printing operations to known causes with solutions automatically.

A process 1100 for detecting inoperative inkjet patterns within test patterns printed on RTMJ sheets during a print job and identifying their known causes and solutions is shown in FIG. 11. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 80 noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

The process 1100 begins by printing a test pattern on a RTMJ sheet during a print job (block 1104). The test pattern is formed by operating every inkjet in every printhead in the printer. Image data of the test pattern is generated (block 1108) and a printhead map for each printhead is generated using the image data of the test pattern (block 1112). An index for a printhead map is generated (block 1116) by generating an extracted feature descriptor as described above and the index is compared to the indexes stored in the dictionary 312 in database 92 (block 1120). A match between an index corresponding to a printhead map and an index in the dictionary is detected, if the similarity score between the two indexes is greater than a predetermined threshold. The index corresponding to the printhead map is compared to each index in the dictionary and the dictionary index that produces the greatest matching score greater than the threshold results in the operation of the printer being stopped and the associated cause of the cluster is retrieved from the dictionary with its solution and displayed on the user interface 50 (block 1124) so the operator can determine an appropriate course of action. If no match is detected, the process determines if an index for another printhead map needs to be generated (block 1128) and if another printhead map is to be tested, then the process continues by generating the index and determining if it matches an index in the dictionary (blocks 1116 to 1124). Otherwise, the print job continues until another test pattern is printed on a RTJM sheet (block 1132) and the evaluation process is repeated. If no other test pattern is to be printed, then the process stops.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed:

1. A method of generating a dictionary of inoperative inkjet patterns comprising:
   identifying at least one cluster of feature descriptors from a plurality of inoperative inkjet patterns;
   generating an index using one of the feature descriptors that is closest to a center of the at least one cluster; and
   storing the at least one cluster of feature descriptors in a non-transitory computer readable storage memory in association with the generated index.

2. The method of claim 1 further comprising:
   removing noise from the plurality of inoperative inkjet patterns before identifying the at least one cluster.

3. The method of claim 2, the noise removal further comprising:
   generating at least one printhead map having a plurality of rows and a plurality of columns of data representing an operational status of each inkjet in a plurality of inkjets in a printhead;
   identifying noise rows and noise columns in the at least one printhead map using an adaptive threshold;
   changing the operational status of all inkjets in the identified noise rows and noise columns to indicate the inkjets are operational; and
   applying a median filter to the at least one printhead map after the operational status of inkjets in the noise rows and the noise columns have been changed and changing the operational status of inkjets identified by the median filter as being isolated inkjets to indicate the inkjets are operational.

4. The method of claim 3 wherein the adaptive threshold is selected using Otsu's method.

5. The method of claim 3 wherein the median filter is a 1 by 3 median filter.

6. The method of claim 3 further comprising:
   eliminating the at least one printhead map in response to a number of inoperative inkjets in the at least one printhead map being less than a predetermined threshold after the adaptive threshold and the median filter have been applied.

7. The method of claim 6 further comprising:
   identifying an average number of inoperative inkjets in each row and each column of the at least one printhead map and concatenating the average number of inoperative inkjets in each column to one another and concatenating the average number of inoperative inkjets in each row to the concatenated average number of inoperative inkjets in the columns to form a feature descriptor for the at least one printhead map.

8. The method of claim 7 further comprising:
   applying a Principal Component Analysis to the feature descriptor to reduce a dimension of the feature descriptor.

9. The method of claim 6 further comprising:
   applying a Convolutional Neural Network to the at least one printhead map to form a feature descriptor for the at least one printhead map.

10. The method of claim 9 further comprising:
    applying a Principal Component Analysis to the feature descriptor to reduce a dimension of the feature descriptor.

11. The method of claim 7, the identification of the at least one cluster further comprising:
    applying a Gaussian Mixture Model to a plurality of feature descriptors.

12. The method of claim 11 further comprising:
    measuring a distance between a feature descriptor at a center of the at least one cluster and each of the other feature descriptors in the at least one cluster; and
    removing the feature descriptors having a measured distance that is greater than a predetermined threshold.

13. The method of claim 12 further comprising:
    generating a score indicating a similarity between the feature descriptor at the center of a first cluster and the feature descriptor at the center of a second cluster;
    combining the first cluster and the second cluster in response to the score being greater than a predetermined threshold;
    generating an index for the combined cluster using a feature descriptor at a center of the combined cluster; and
    storing the index for the combined cluster in the non-transitory computer readable storage memory in association with the combined cluster.

14. An inoperative inkjet pattern analyzer that generates a dictionary of inoperative inkjet patterns comprising:
    a non-transitory computer readable storage memory; and
    a controller operatively connected to the non-transitory computer readable storage memory, the controller being configured to:
    identify at least one cluster of feature descriptors from a plurality of inoperative inkjet patterns;
    generate an index using one of the feature descriptors that is closest to a center of the at least one cluster; and
    store the at least one cluster of feature descriptors in the non-transitory computer readable storage memory in association with the generated index.

15. The analyzer of claim 14, the controller being further configured to:
    remove noise from the plurality of inoperative inkjet patterns before identifying the at least one cluster.

16. The analyzer of claim 15, the controller being further configured to remove noise by:
    generating at least one printhead map having a plurality of rows and a plurality of columns of data representing an operational status of each inkjet in a plurality of inkjets in a printhead;
    identifying noise rows and noise columns in the at least one printhead map using an adaptive threshold;

changing the operational status of all inkjets in the identified noise rows and noise columns to indicate the inkjets are operational; and applying a median filter to the at least one printhead map after the operational status of inkjets in the noise rows and the noise columns have been changed and changing the operational status of inkjets identified by the median filter as being isolated to indicate the inkjets are operational.

17. The analyzer of claim 16 wherein adaptive threshold is selected using Otsu's method.

18. The analyzer of claim 16 wherein the median filter is a 1 by 3 median filter.

19. The analyzer of claim 16, the controller being further configured to:
   eliminate the at least one printhead map in response to a number of inoperative inkjets in the at least one printhead map being less than a predetermined threshold after the adaptive threshold and the median filter have been applied.

20. The analyzer of claim 19, the controller being further configured to:
   identify an average number of inoperative inkjets in each row and each column of the at least one printhead map and concatenating the average number of inoperative inkjets in each column to one another and concatenating the average number of inoperative inkjets in each row to the concatenated average number of inoperative inkjets in the columns to form a feature descriptor for the at least one printhead map.

21. The analyzer of claim 20, the controller being further configured to:
   apply a Principal Component Analysis to the feature descriptor to reduce a dimension of the feature descriptor.

22. The analyzer of claim 19, the controller being further configured to:
   apply a Convolutional Neural Network to the at least one printhead map to form a feature descriptor for the at least one printhead map.

23. The analyzer of claim 22, the controller being further configured to:
   apply a Principal Component Analysis to the feature descriptor to reduce a dimension of the feature descriptor.

24. The analyzer of claim 20, the controller being further configured to identify the at least one cluster by:
   applying a Gaussian Mixture Model to a plurality of feature descriptors.

25. The analyzer of claim 24, the controller being further configured to:
   measure a distance between a feature descriptor at a center of the at least one cluster and each of the other feature descriptors in the at least one cluster; and
   remove the feature descriptors having a measured distance that is greater than a predetermined threshold.

26. The analyzer of claim 25, the controller being further configured to:
   generate a score indicating a similarity between the feature descriptor at the center of a first cluster and the feature descriptor at the center of a second cluster;
   combine the first cluster and the second cluster in response to the score being greater than a predetermined threshold;
   generate an index for the combined cluster using a feature descriptor at a center of the combined cluster; and
   store the index for the combined cluster in the non-transitory computer readable storage memory in association with the combined cluster.

* * * * *